United States Patent
Wu et al.

(10) Patent No.: US 10,641,984 B2
(45) Date of Patent: May 5, 2020

(54) DRIVING MECHANISM

(71) Applicant: TDK TAIWAN CORP., Yangmei Taoyuan (TW)

(72) Inventors: Fu-Yuan Wu, Yangmei Taoyuan (TW); Shih-Ting Huang, Yangmei Taoyuan (TW); Yi-Hsin Nieh, Yangmei Taoyuan (TW); Sin-Jhong Song, Yangmei Taoyuan (TW)

(73) Assignee: TDK TAIWAN CORP., Yangmei, Taoyuan (TW)

( * ) Notice: Subject to any disclaimer, the term of this patent is extended or adjusted under 35 U.S.C. 154(b) by 154 days.

(21) Appl. No.: 15/850,801

(22) Filed: Dec. 21, 2017

(65) Prior Publication Data

US 2018/0180838 A1 Jun. 28, 2018

Related U.S. Application Data

(60) Provisional application No. 62/438,749, filed on Dec. 23, 2016.

(30) Foreign Application Priority Data

Dec. 8, 2017 (CN) .......................... 2017 1 1293803

(51) Int. Cl.
*G02B 7/02* (2006.01)
*G02B 7/09* (2006.01)
(Continued)

(52) U.S. Cl.
CPC ................ *G02B 7/09* (2013.01); *G02B 7/021* (2013.01); *G02B 7/102* (2013.01); *G02B 7/28* (2013.01);
(Continued)

(58) Field of Classification Search
CPC .......... G02B 7/021; G02B 7/09; G02B 7/102; G02B 7/28; G02B 7/02; G02B 7/10;
(Continued)

(56) References Cited

U.S. PATENT DOCUMENTS 7,474,473 B1 * 1/2009 Wang ....................... G02B 7/08
359/703
9,955,086 B2 * 4/2018 Park ......................... G02B 7/08
(Continued)

FOREIGN PATENT DOCUMENTS

| CN | 102187273 B | 3/2014 |
| TW | 201308838 A | 2/2013 |
| TW | 201403202 A | 1/2014 |

OTHER PUBLICATIONS

TIPO. Office Action for corresponding Application No. TW 106143134, dated Oct. 1, 2018. 7 pages.

*Primary Examiner* — William R Alexander
*Assistant Examiner* — Balram T Parbadia
(74) *Attorney, Agent, or Firm* — Muncy, Geissler, Olds & Lowe, P.C.

(57) ABSTRACT

A driving mechanism for driving an optical element is provided, including a housing module, a hollow holder, and an electromagnetic driving assembly. The holder is movably disposed in the housing module for holding the optical element, wherein the holder has a sidewall portion forming a through hole. The electromagnetic driving assembly includes a first magnetic element and a second magnetic element, wherein the first magnetic element is disposed on the holder and exposed to an inner side of the holder via the through hole, and the second magnetic element is connected to the housing module and corresponds to the first magnetic element to move the holder relative to the housing module.

20 Claims, 20 Drawing Sheets

(51) Int. Cl.
  *G02B 7/28* (2006.01)
  *G03B 13/36* (2006.01)
  *G02B 7/10* (2006.01)
  *G03B 3/10* (2006.01)
(52) U.S. Cl.
  CPC ............... *G03B 3/10* (2013.01); *G03B 13/36* (2013.01); *G03B 2205/0069* (2013.01)
(58) Field of Classification Search
  CPC . G02B 7/04; G03B 13/36; G03B 3/10; G03B 2205/0069
  See application file for complete search history.

(56) References Cited

U.S. PATENT DOCUMENTS

| | | | | |
|---|---|---|---|---|
| 9,989,727 B2* | 6/2018 | Shin | .......................... | G02B 7/09 |
| 2009/0040631 A1* | 2/2009 | Wong | ..................... | G02B 7/021 |
| | | | | 359/811 |
| 2009/0225452 A1* | 9/2009 | Wu | ........................ | G02B 7/023 |
| | | | | 359/824 |
| 2010/0277800 A1* | 11/2010 | Wu | .......................... | G02B 7/08 |
| | | | | 359/513 |
| 2013/0076924 A1* | 3/2013 | Wade | ...................... | G03B 5/02 |
| | | | | 348/208.11 |
| 2013/0114153 A1* | 5/2013 | Lu | ......................... | H04N 5/2257 |
| | | | | 359/819 |
| 2014/0049848 A1* | 2/2014 | Hsu | .......................... | G02B 7/10 |
| | | | | 359/823 |
| 2016/0048033 A1* | 2/2016 | Kim | ..................... | G02B 27/646 |
| | | | | 348/357 |
| 2016/0054578 A1* | 2/2016 | Dong | .................. | G02B 27/646 |
| | | | | 359/557 |
| 2016/0116703 A1* | 4/2016 | Cheng | ................. | H02K 41/0356 |
| | | | | 359/557 |
| 2016/0139426 A1* | 5/2016 | Park | ..................... | G02B 27/646 |
| | | | | 359/557 |
| 2016/0291344 A1* | 10/2016 | Terajima | .............. | H04M 1/0264 |
| 2016/0316121 A1* | 10/2016 | Park | .......................... | G02B 7/08 |
| 2017/0235095 A1* | 8/2017 | Sekimoto | ................. | G02B 7/09 |
| | | | | 359/824 |
| 2018/0100984 A1* | 4/2018 | Wu | .......................... | G03B 13/36 |
| 2018/0128649 A1* | 5/2018 | Terajima | ............ | H02K 41/0356 |

* cited by examiner

DRIVING MECHANISM

CROSS REFERENCE TO RELATED APPLICATIONS

This Application claims priority claims priority of provisional U.S. Patent Application Ser. No. 62/438,749 filed on Dec. 23, 2016 and China Patent Application Ser. No. 201711293803.0 filed on Dec. 8, 2017, the entirety of which is incorporated by reference herein.

BACKGROUND OF THE DISCLOSURE

Field of the Invention

The present invention relates to a driving mechanism, and more particularly to a driving mechanism using electromagnetic force to move an optical element.

Description of the Related Art

With progress of technologies, the cameras have been widely applied to portable electronic devices such as cell phones and tablet computers. To achieve high image quality of the camera, electromagnetic driving mechanisms have been used to rapidly adjust the position of the camera lens module and obtain a clear image by a photosensor, thus facilitating auto-focus and auto-zoom control of the camera.

As the trend has been miniaturization of the camera lens module, the dimensions of the driving mechanism have to be reduced, so that damages to the driving mechanism may occur due to inadequate structural strength thereof. Therefore, to both miniaturize the dimensions and provide adequate structural strength of the driving mechanism has become an important issue.

BRIEF SUMMARY OF THE DISCLOSURE

Accordingly, one objective of the present invention is to provide a driving mechanism for driving an optical element, including a housing module, a hollow holder, and an electromagnetic driving assembly. The holder is movably disposed in the housing module for holding the optical element, wherein the holder has a sidewall portion forming a through hole. The electromagnetic driving assembly includes a first magnetic element and a second magnetic element, wherein the first magnetic element is disposed on the holder and exposed to an inner side of the holder via the through hole, and the second magnetic element is connected to the housing module and corresponds to the first magnetic element to move the holder relative to the housing module.

According to some embodiments of the disclosure, the housing module has a cover having a top portion and a plurality of side walls, and the top portion forms an opening extending to at least one of the side walls.

According to some embodiments of the disclosure, the opening has a substantially round shape and forms a protruding area extending to the at least one of the side walls.

According to some embodiments of the disclosure, the cover comprises metal material.

According to some embodiments of the disclosure, the housing module has a polygonal structure, and the second magnetic element is disposed at a corner of the polygonal structure.

According to some embodiments of the disclosure, a part of the first magnetic element is tangential to an inner surface of the sidewall portion.

According to some embodiments of the disclosure, the first magnetic element comprises a magnet or a coil.

According to some embodiments of the disclosure, the first magnetic element comprises a planar coil and surrounds the holder.

According to some embodiments of the disclosure, the housing module has a cover and a base connected to each other, and the cover has a metal member and a plastic body which are integrally formed in one piece.

According to some embodiments of the disclosure, the metal member forms a rod portion at a corner of the metal member, and the plastic body has an embedding portion with the rod portion embedded therein.

According to some embodiments of the disclosure, the metal member and the plastic body are integrally formed in one piece by insert molding process.

According to some embodiments of the disclosure, the housing module has a cover and a base connected to each other, the cover comprises metal material, and the base comprises plastic material, wherein the cover and the base are integrally formed in one piece.

According to some embodiments of the disclosure, the cover forms a rod portion at a corner of the cover, and the base forms an embedding portion with the rod portion embedded therein.

According to some embodiments of the disclosure, the cover and the base are integrally formed in one piece by insert molding process.

According to some embodiments of the disclosure, an outer surface of the sidewall portion forms a recess communicated with the through hole, and the first magnetic magnet is disposed in the recess.

According to some embodiments of the disclosure, the housing module has a base having a protruding portion extending along an optical axis of the optical element, and the second magnetic element is fixed to the protruding portion and corresponds to the first magnetic element.

According to some embodiments of the disclosure, the housing module has a quadrilateral base having two protruding portions extending along an optical axis of the optical element, and the protruding portions are respectively located at two diagonal corners of the base, corresponding to the electromagnetic driving assembly.

According to some embodiments of the disclosure, the driving mechanism further comprises two springs, wherein the base further has two connecting portions at the other two corners of the base, and the two springs respectively connect the connecting portions with the holder.

According to some embodiments of the disclosure, the holder comprises a metal frame and a plastic body connected to the metal frame.

According to some embodiments of the disclosure, the first magnetic element is a coil having a winding portion, and the plastic body has a flat sustaining portion to sustain the winding portion.

Another objective of the present invention is to provide a driving mechanism for driving an optical element, including a cover, a hollow holder, and an electromagnetic driving assembly. The cover has a top portion and an extending portion, wherein the top portion forms an opening, and the extending portion extends from an inner edge of the opening along an optical axis of the optical element. The holder is movably disposed in the cover for holding the optical element, wherein the holder has a sidewall portion forming a through hole, and the extending portion is exposed to an inner side of the holder via the through hole. The electromagnetic driving assembly includes a first magnetic element and a second magnetic element, wherein the first magnetic element is disposed on the holder, and the second magnetic element is connected to the cover and corresponds to the first magnetic element to move the holder relative to the cover.

According to some embodiments of the disclosure, the holder further has a top surface and a restricting groove formed on the top surface, the restricting groove is communicated with the through hole, and the extending portion is extended into the restricting groove.

BRIEF DESCRIPTION OF THE DRAWINGS

For a more complete understanding of the embodiments, and the advantages thereof, reference is now made to the following descriptions taken in conjunction with the accompanying drawings.

DETAILED DESCRIPTION OF THE ILLUSTRATIVE EMBODIMENTS

While the invention has been described in connection with various aspects, it will be understood that the invention is capable of further modifications. This application is intended to cover any variations, uses or adaptation of the invention following, in general, the principles of the invention, including such departures from the present disclosure as come within the known and customary practice within the art to which the invention pertains.

In the following detailed description of the preferred embodiments, reference is made to the accompanying drawings, and in which specific embodiments of which the invention may be practiced are shown by way of illustration. In this regard, directional terminology, such as "top," "bottom," "front," "back," etc., is used with reference to the orientation of the figures being described. The components of the present invention can be positioned in a number of different orientations. As such, the directional terminology is used for the purposes of illustration and is in no way limiting.

Figure 1A:
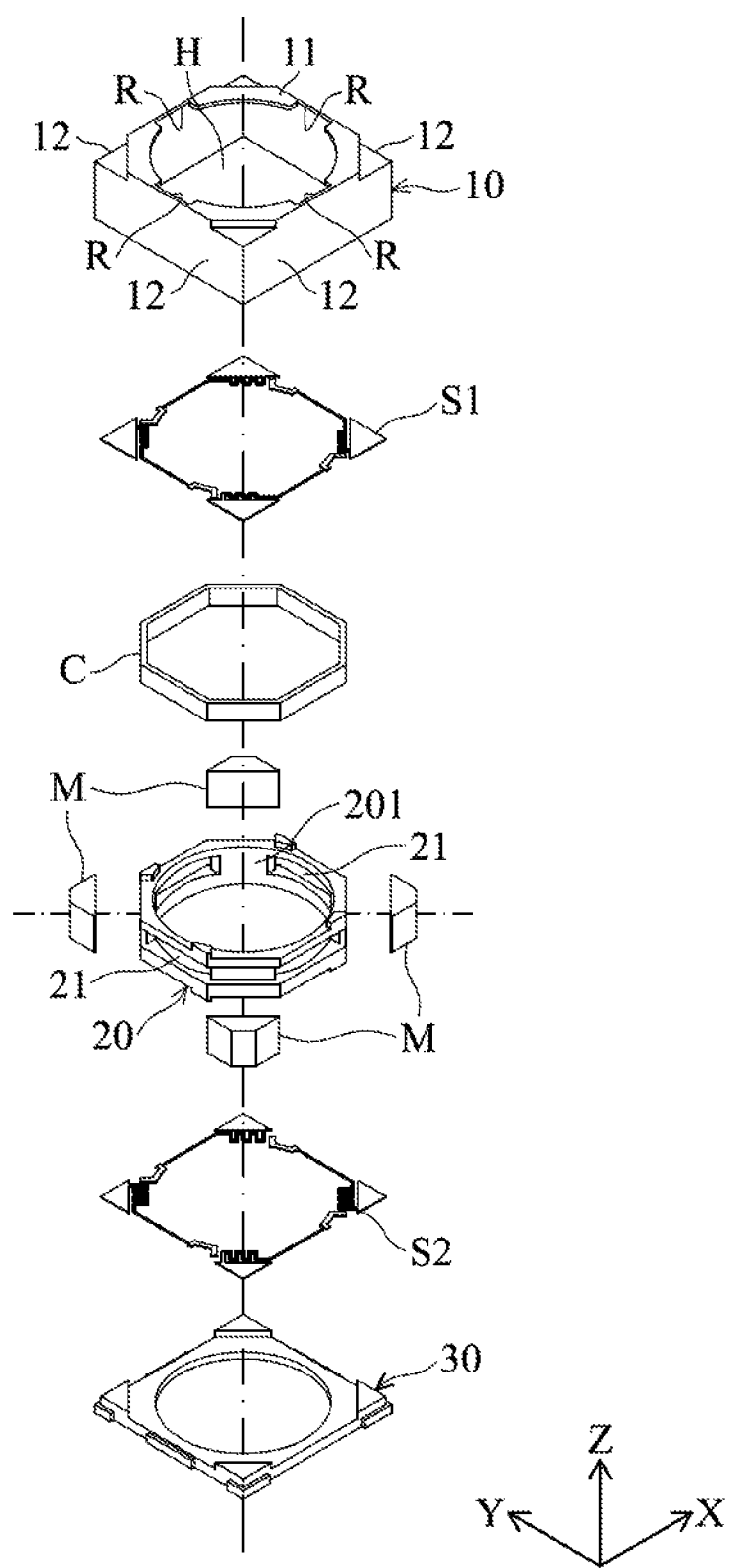
FIG. 1A shows an exploded diagram of a driving mechanism, in accordance with an embodiment of the invention.
Figure 1B:
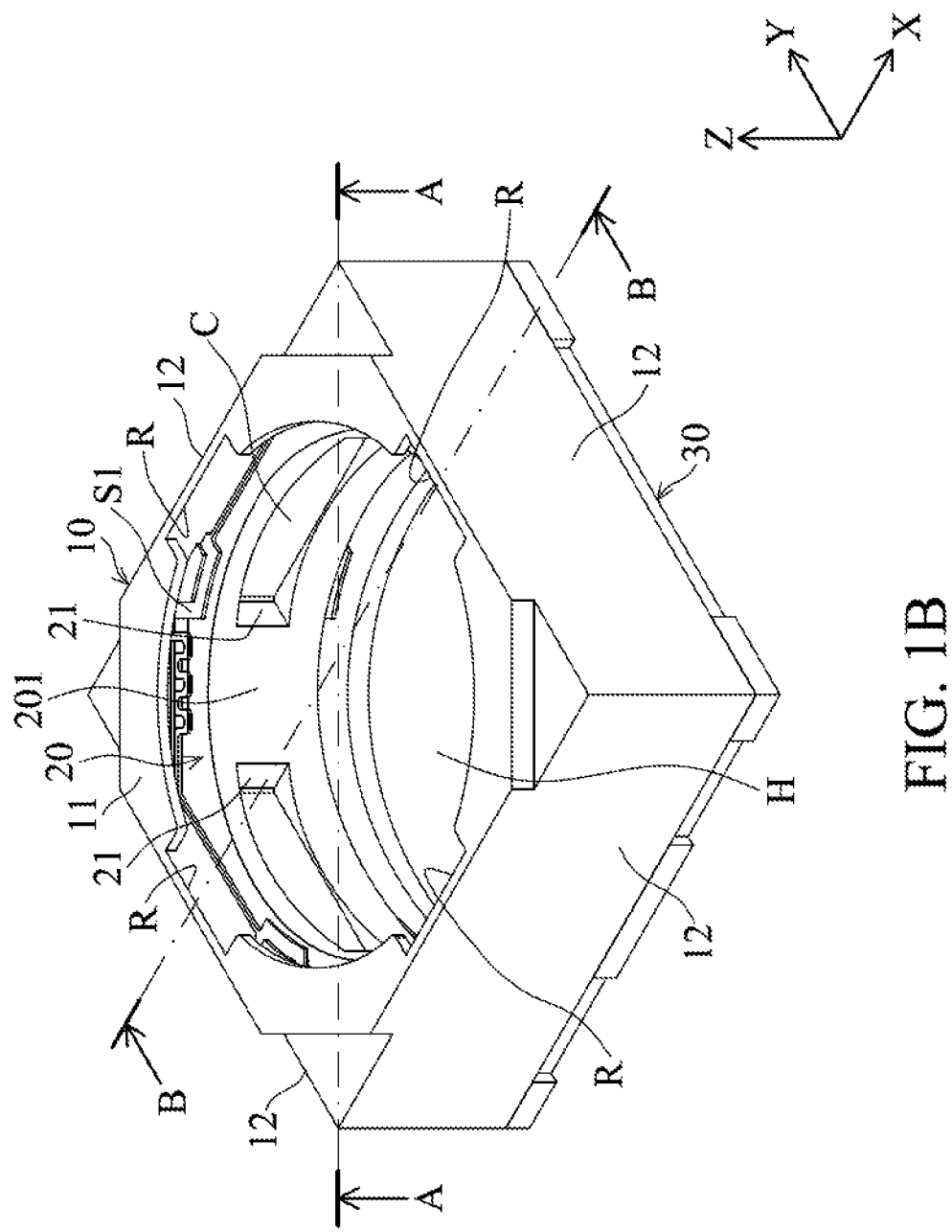
FIG. 1B shows a perspective diagram of the driving mechanism in FIG. 1A.
Figure 1C:
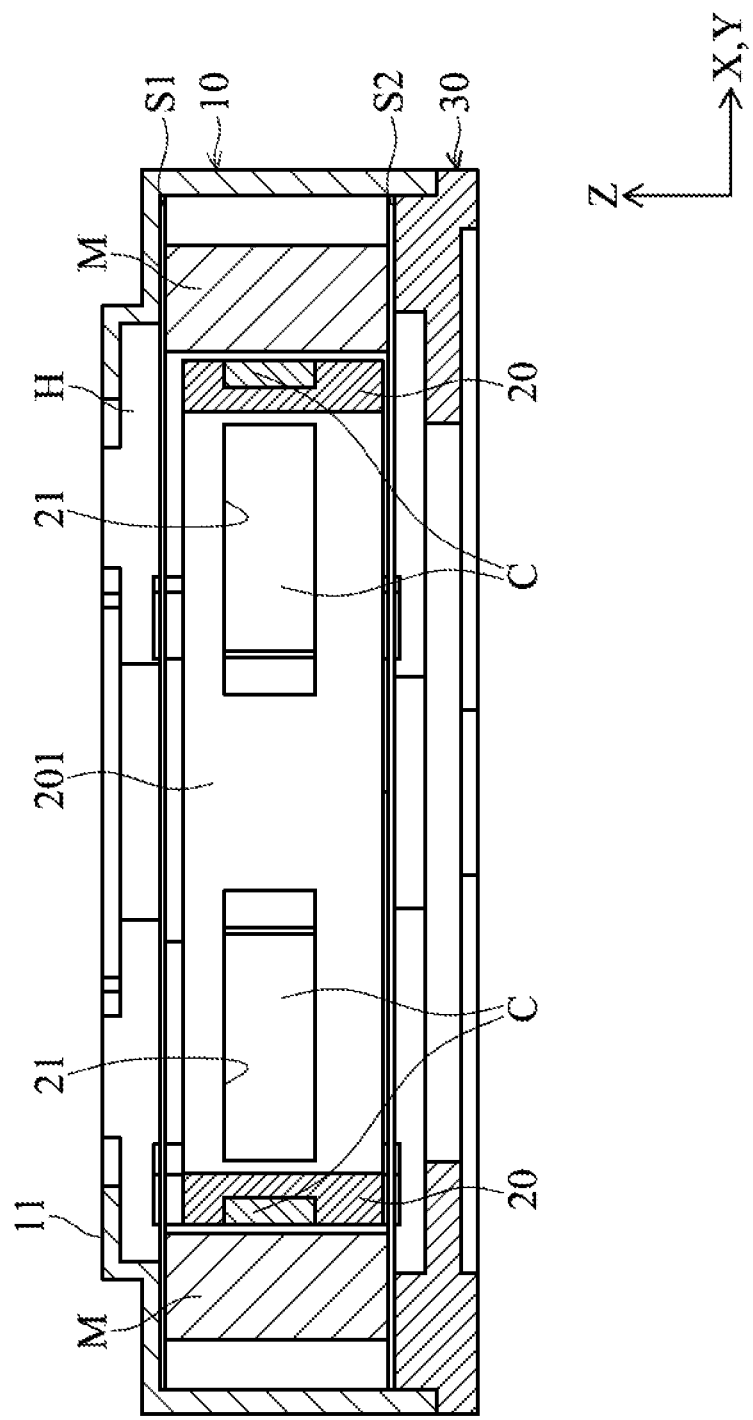
FIG. 1C shows a cross-sectional view along line A-A in FIG. 1B
Figure 1D:
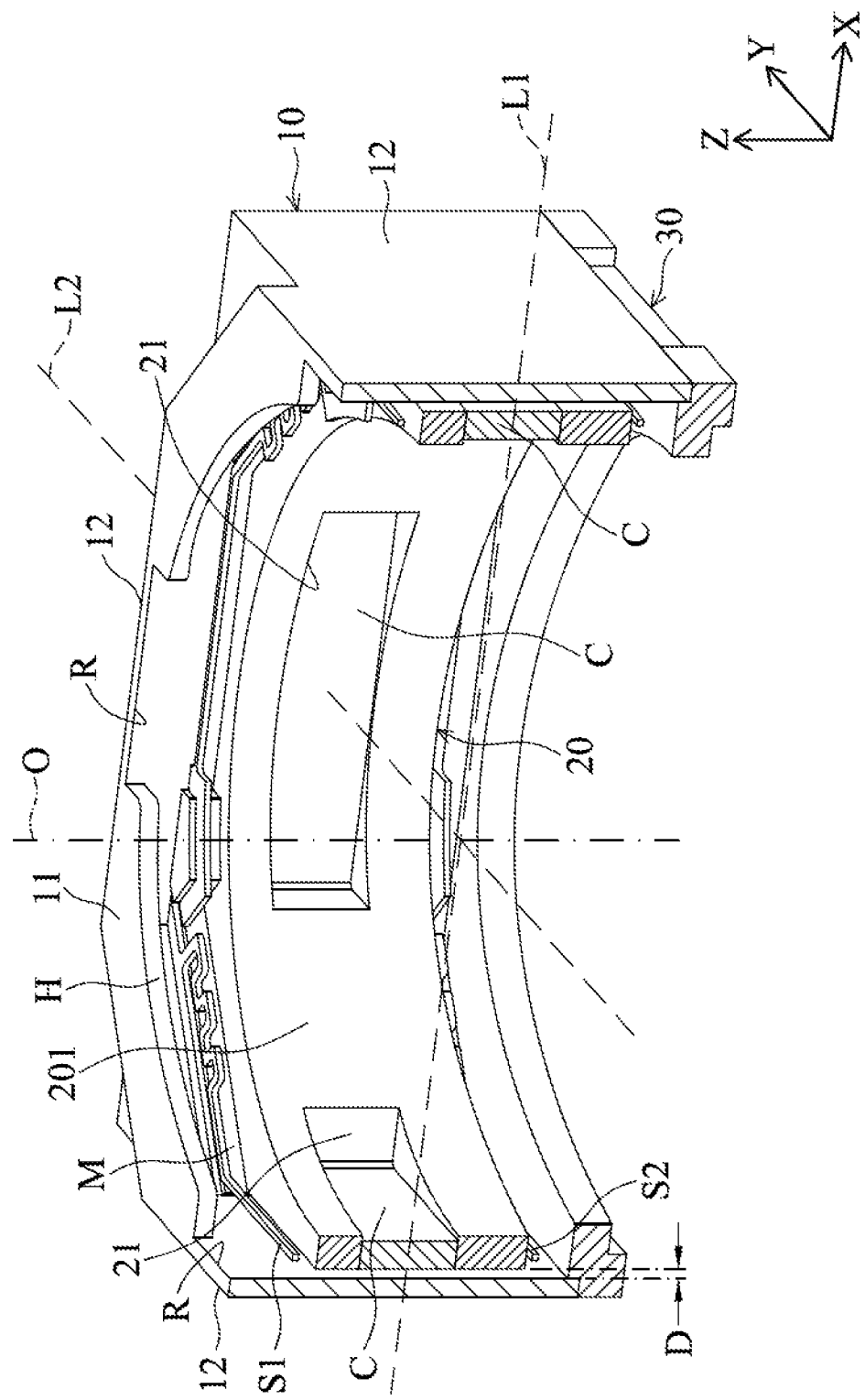
FIG. 1D shows a cross-sectional view along line B-B in FIG. 1B.

Referring to FIGS. 1A-1D, FIG. 1A is an exploded diagram showing a driving mechanism according to an embodiment of the invention, FIG. 1B is a perspective diagram showing the driving mechanism of FIG. 1A, FIG. 1C is a cross-sectional view along line A-A in FIG. 1B, and FIG. 1D is a cross-sectional view along line B-B in FIG. 1B. As shown in FIGS. 1A-1B, the driving mechanism is used for driving an optical element such as an optical lens, primarily comprising a cover 10, a hollow holder 20, a base 30, a coil C, at least an upper spring S1, at least a lower spring S2, and at least a magnet M.

The holder 20 is used for receiving the optical element (e.g. optical lens). In this embodiment, the driving mechanism may be disposed in a portable electronic device, such as a cell phone or tablet computer, and electrically connected to an circuit unit (not shown) to adjust the position of the optical element, so that the light though the optical element can be precisely focused onto a photosensor (not shown) to obtain a clear image. In some embodiments, the driving mechanism may be a Voice Coil Motor (VCM) to achieve autofocusing and/or zooming.

As depicted in FIGS. 1A-1D, the cover 10 and the base 30 can be connected to each other and form a housing module, wherein the holder 20, the coil C, the upper and lower springs S1 and S2, and the magnet M are all received in the housing module. The coil C (first magnetic element) may comprise a planar coil and surround the holder 20. Specifically, the coil C, the holder 20, and the optical element received therein are movably connected to the cover 10 and/or base 30 via the upper spring S1 and/or the lower spring S2, whereby they can be suspended in the housing module and movable along the Z axis. Here, the cover 10 has a polygonal structure, and the magnet M (second magnetic element) is fixed at an corner of the cover 10, corresponding to the coil C on the holder 20.

In this embodiment, the coil C and at least one of the magnets M corresponding thereto can constitute an electromagnetic driving assembly. When an electrical current is applied to the coil C, a magnetic force can be generated between the coil C and the magnet M, so as to drive the coil C, the holder 20, and the optical element therein to move along the Z axis relative to the housing module, thereby achieving autofocusing and/or zooming. It should be noticed that the positions of the coil C and the magnet M can be exchanged. That is, the magnet M can be disposed on the holder 20 as the first magnetic element, and correspondingly, the coil C (such as planar coil) can be fixed to the cover 10 or the base 30 as the second magnetic element, so that a magnetic force can be produced to drive the coil C, the holder 20, and the optical element therein to move along the Z axis relative to the cover 10 and the base 30.

To miniaturize the dimensions of the driving mechanism along X and Y directions, the holder 20 in this embodiment forms a through hole 21 on a sidewall portion 201 thereof, corresponding to the magnet M. As shown in FIGS. 1C and 1D, the coil C is located close to an inner surface of the sidewall portion 201, and at least a part of the coil C is exposed to the inner side of the holder 20 via the through hole 21. FIG. 1D clearly shows that the two sets of the through holes 21 on opposite sides of the holder 20 define two extending lines L1 and L2. The extending lines L1 and L2 are respectively parallel to the X and Y axes which are substantially perpendicular to an optical axis O of the optical element. It should be noted that when observed from the inside (optical axis O) to the outside of the driving mechanism, the extending lines L1 and L2 are extended from the optical axis O and sequentially through the optical element, the coil C, and the cover 10, wherein the coil C and the cover 10 directly face each other with a gap C formed therebetween (FIG. 1D). That is, no magnet is disposed between the coil C and the cover 10. Since the holder 20 can carry various types of optical element in the driving mechanism of compact dimensions, the convenience of usage and design flexibility can be greatly improved. Moreover, based on the configuration in this embodiment, space utilization can be more efficient, and the dimensions of the coil C and the holder 20 along the horizontal direction (XY plane) can also be reduced to achieve miniaturization of the driving mechanism.

Figure 1E:
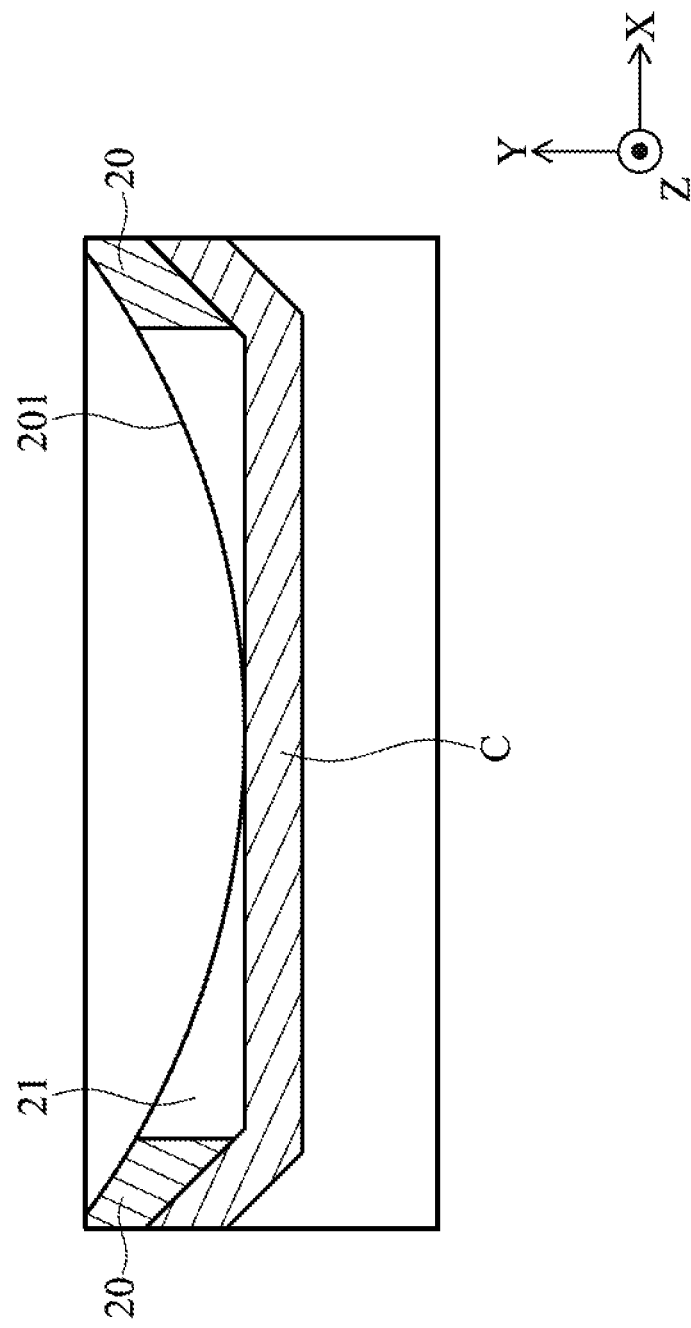
FIG. 1E shows a cross-sectional view of a part of coil C tangential to a curved inner surface of the sidewall portion 201.

In some embodiments, as shown in FIG. 1E, to further reduce the dimensions of the coil C and the holder 20 along the horizontal direction (XY plane) as much as possible, a part of the coil C can be tangential to the inner surface of the sidewall portion 201, so as to facilitate miniaturization of the driving mechanism.

Still referring to FIGS. 1A-1D, the cover 10 has a top portion 11 and four side walls 12. The top portion 11 forms a substantially round opening H, and the opening H has at least a protruding area R extending to at least one of the side walls 12. It should be noticed that the cover 10 in this embodiment may comprise metal and have a quadrilateral structure, wherein the opening H can be formed by punching process. Here, four protruding areas R are respectively extended along the X, −X, Y, −Y directions to the four side walls 12, so that inadequate mechanical strength of the cover 10 due to too short distance between the edge of the opening H and the side walls 12 can be prevented. Moreover, as the dimensions of the cover 10 along the horizontal direction (XY plane) can be efficiently reduced, miniaturization of the driving mechanism can be also achieved.

Figure 2A:
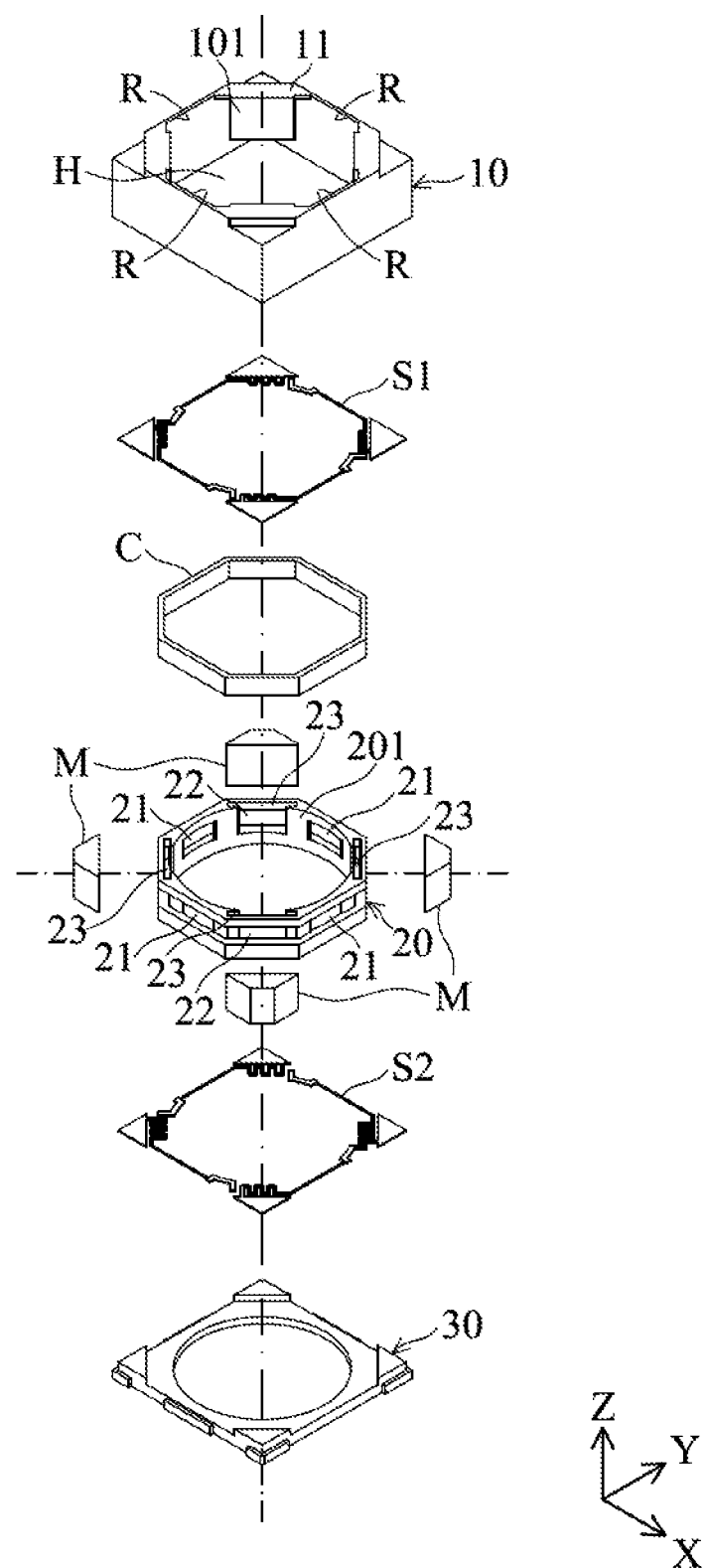
FIG. 2A shows an exploded diagram of a driving mechanism, in accordance with another embodiment of the invention.
Figure 2B:
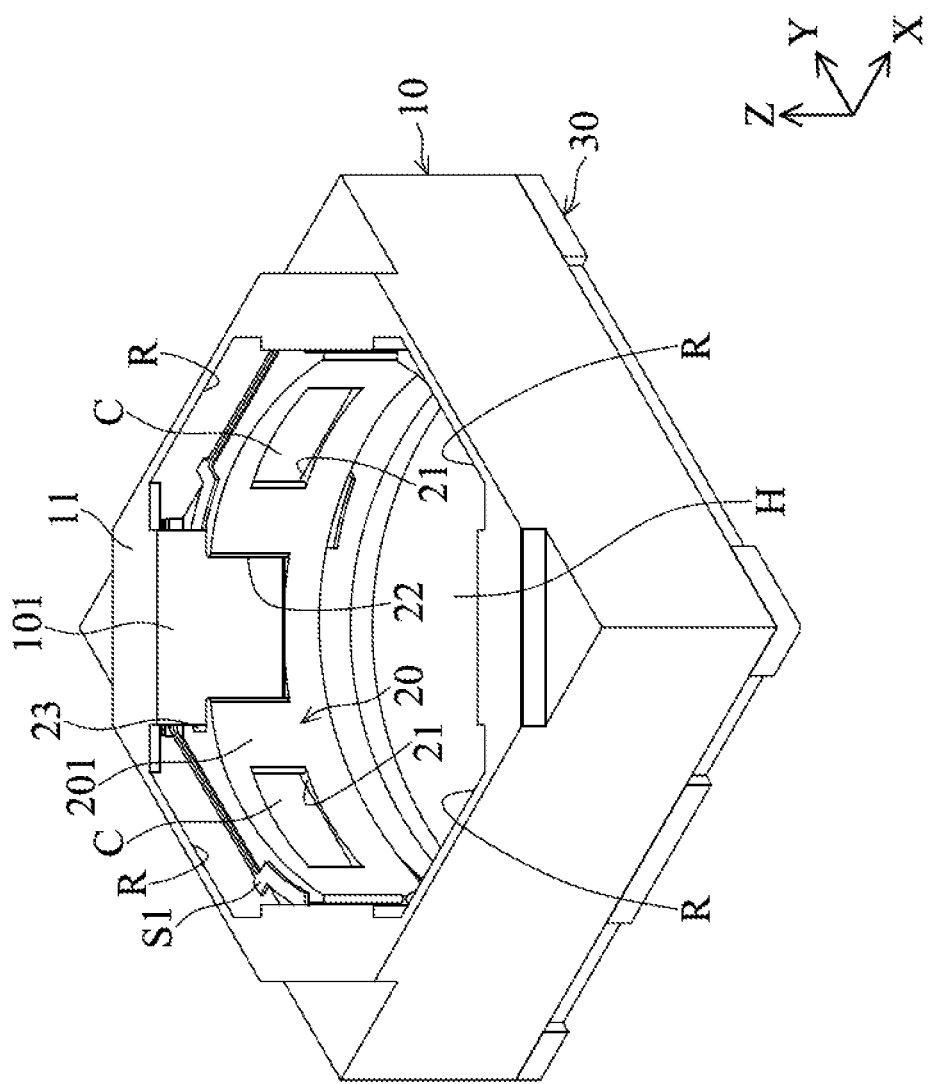
FIG. 2B shows a perspective diagram of the driving mechanism in FIG. 2A after assembly.
Figure 2C:
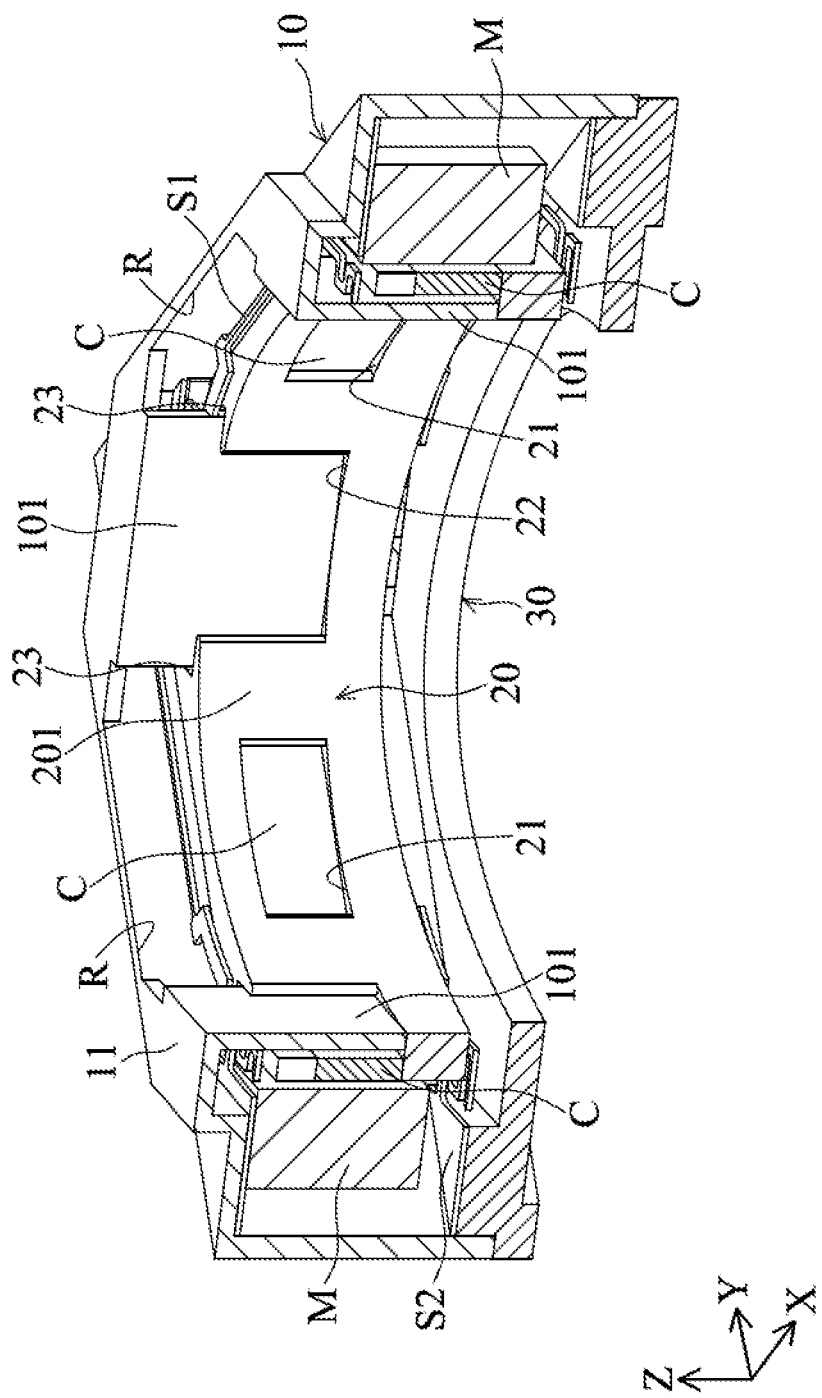
FIG. 2C shows a cross-sectional view of the driving mechanism in FIG. 2B.

FIGS. 2A, 2B, and 2C show another embodiment of a driving mechanism, which is different from the embodiment of FIGS. 1A-1D in that: the holder 20 in the present embodiment forms at least a through hole 21 and another through hole 22, and the cover 10 forms an extending portion 101 connected to the top portion 11. Here, the extending portion 101 is extended downwardly (−Z direction) from an inner edge of the opening H along an optical axis of the optical element, so as to partially or completely block the through hole 22, and the extending portion 101 is exposed to the inner side of the holder 20 via the through hole 22.

Additionally, in FIGS. 2A, 2B, and 2C, at least a restricting groove 23 is formed on the top surface of the holder 20 and communicated with the through hole 22. It should be noticed that the extending portion 101 is inserted into the restricting groove 23 during assembly. Here, the extending portion 101 can be utilized as a stopper in contact against the inner surface of the restricting groove 23, so that the holder 20 can be restricted within a movement/rotation range along the horizontal direction (XY plane), thereby preventing damages to the driving mechanism and particles generated from the holder 20 due to unintentional collisions.

Figure 3A:
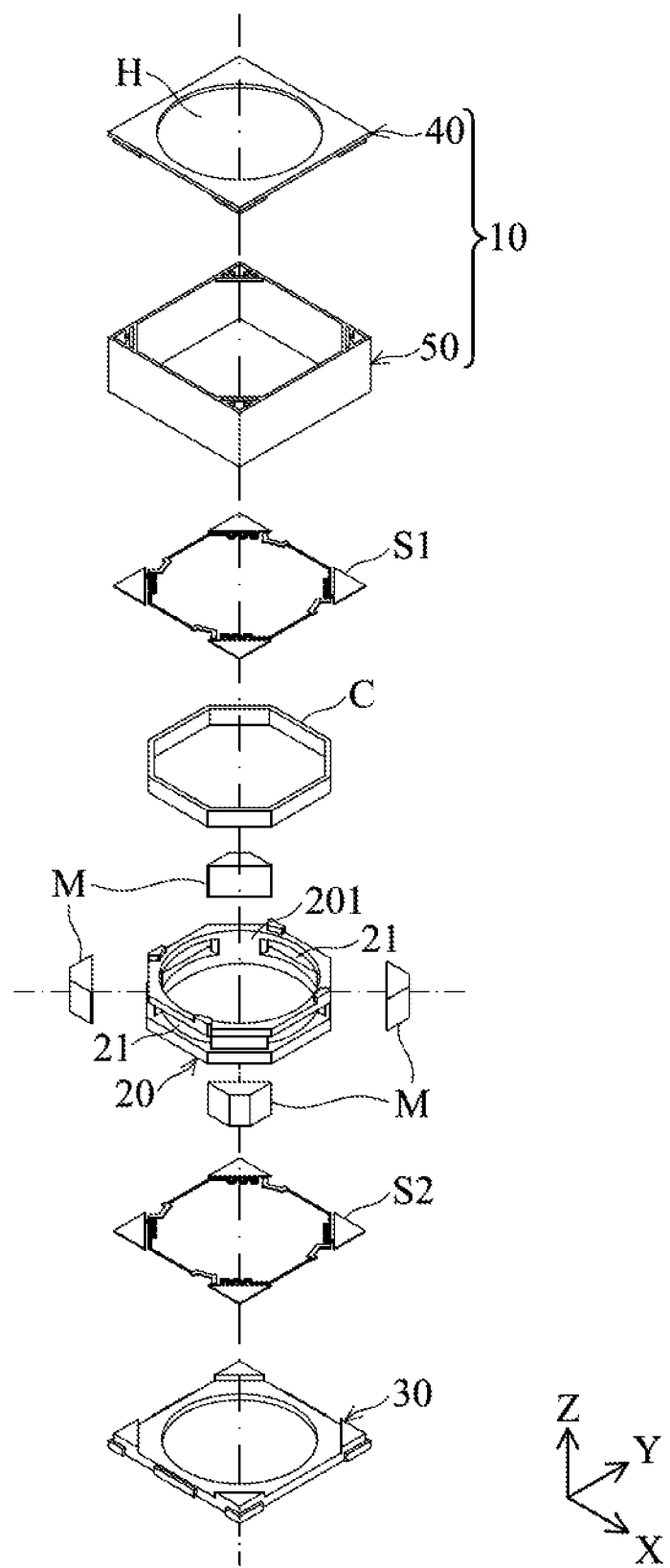
FIG. 3A shows an exploded diagram of a driving mechanism, in accordance with another embodiment of the invention.
Figure 3B:
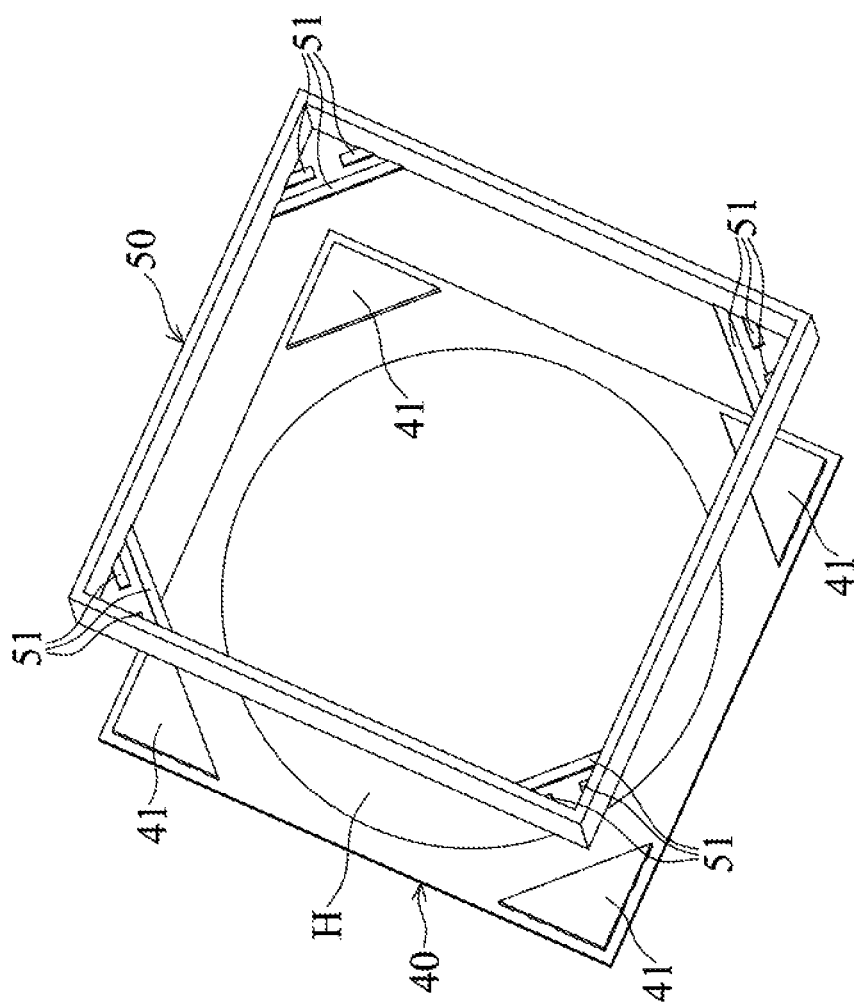
FIG. 3B shows a perspective diagram of the plastic boy 40 and the metal member 50 in FIG. 3A.
Figure 3C:
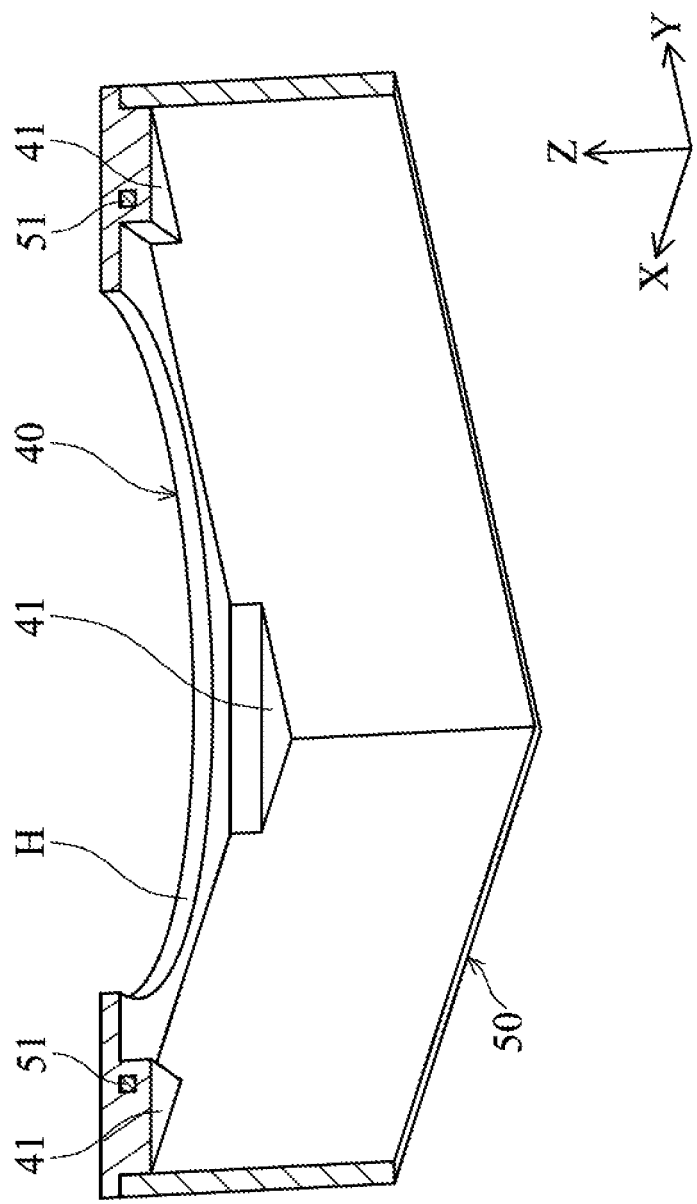
FIG. 3C shows a cross-sectional view of the plastic boy 40 and the metal member 50 in FIG. 3B after assembly.

FIGS. 3A, 3B, and 3C show another embodiment of a driving mechanism, which is different from the embodiment of FIGS. 1A-1D in that: the cover 10 in the present embodiment includes a plastic body 40 and a metal member 50 which are integrally formed with each other in one piece. As shown in FIGS. 3B and 3C, the plastic body 40 forms at least a embedding portion 41 at a corner thereof, and the metal member 50 forms a rod portion 51 at a corner thereof, corresponding to the embedding portion 41. During the manufacturing process, the rod portion 51 can be formed in advance, and the plastic body 40 is then formed on the metal member 50 by insert molding or other plastic forming process with the rod portion 51 embedded into the embedding portion 41 (FIG. 3C).

As described above, the cover 10 in this embodiment is substantially constituted by the plastic body 40 and the metal member 50. It should be noticed that the plastic body 40 can be utilized as the top of the cover 10 instead of metal material, so that the opening H can have a complete round shape without forming the protruding areas R as shown in FIGS. 1A and 1B. Therefore, the problem of inadequate mechanical strength of the cover 10 due to short distance between the edge of the opening H and the side walls of the cover 10 can be efficiently avoided.

Figure 4A:
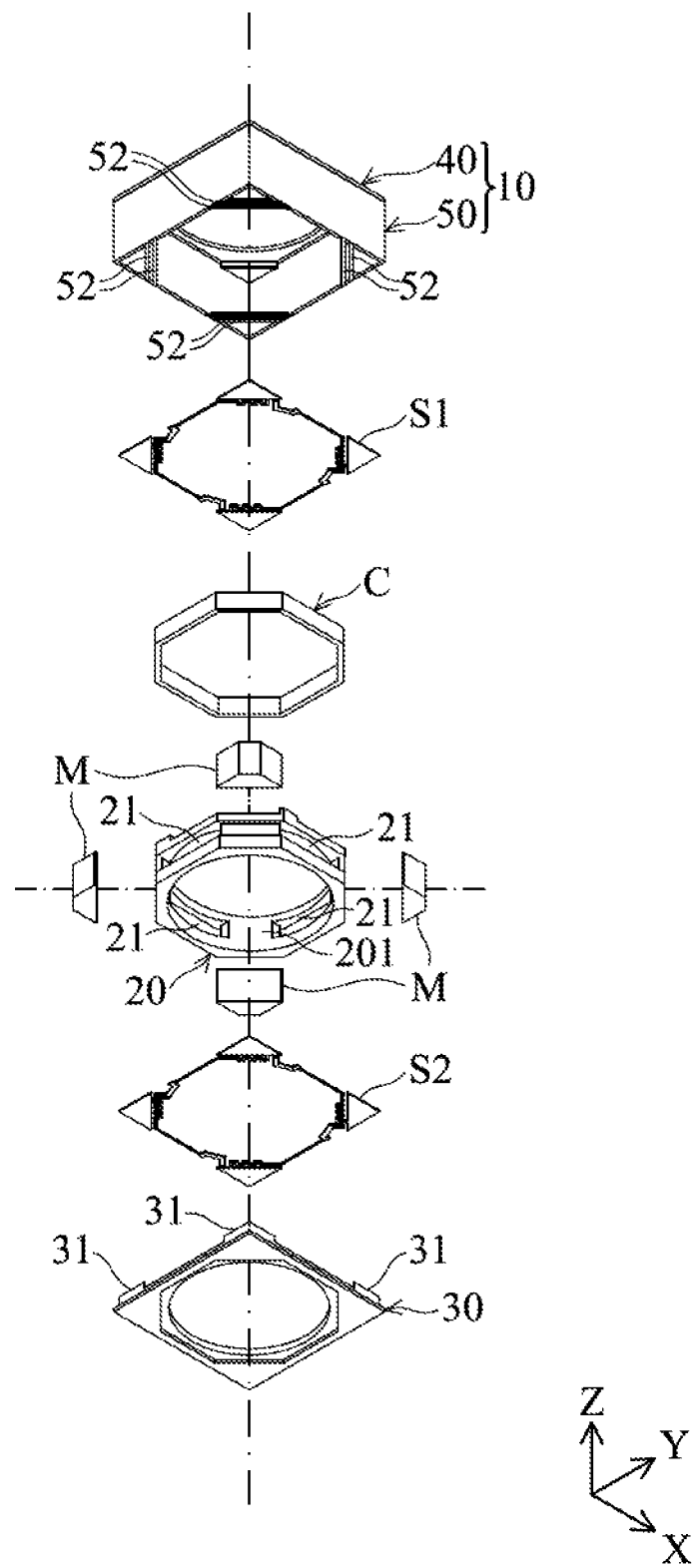
FIG. 4A shows an exploded diagram of a driving mechanism, in accordance with another embodiment of the invention.
Figure 4B:
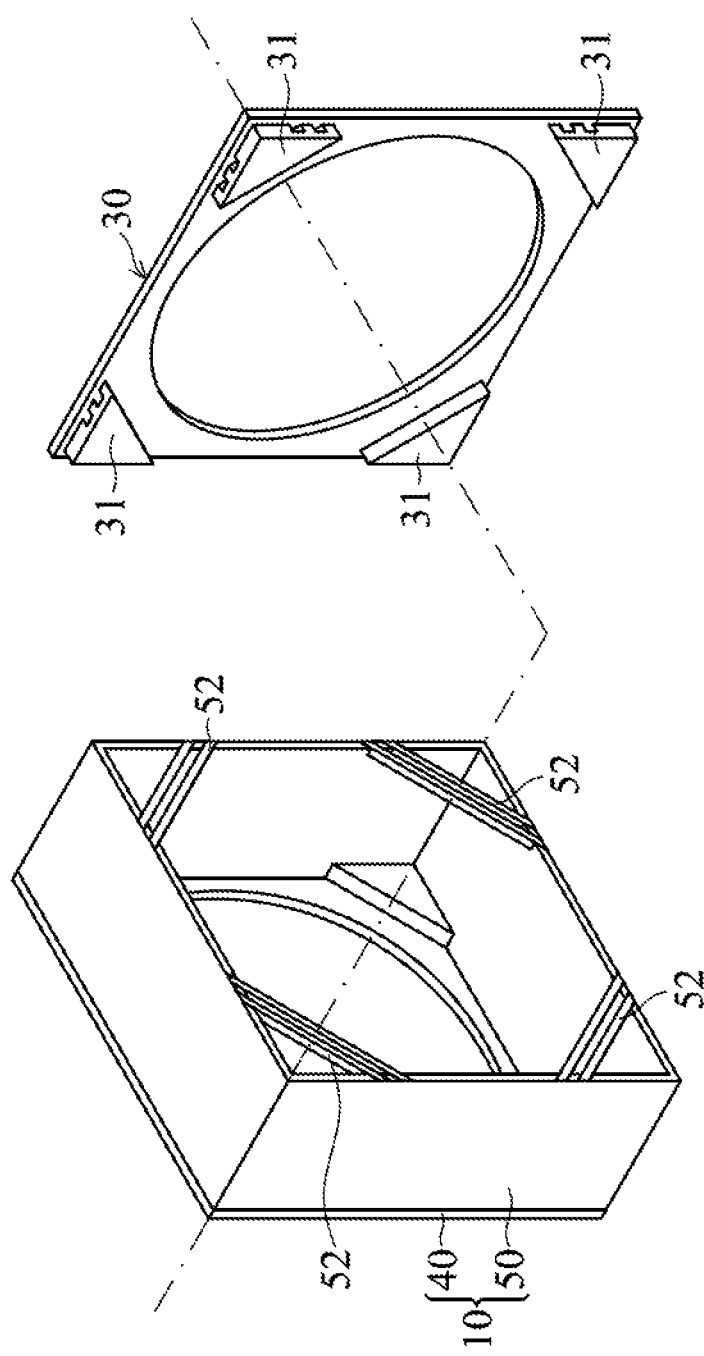
FIG. 4B shows a perspective diagram of the cover 10 and the base 30 in FIG. 4A.
Figure 4C:
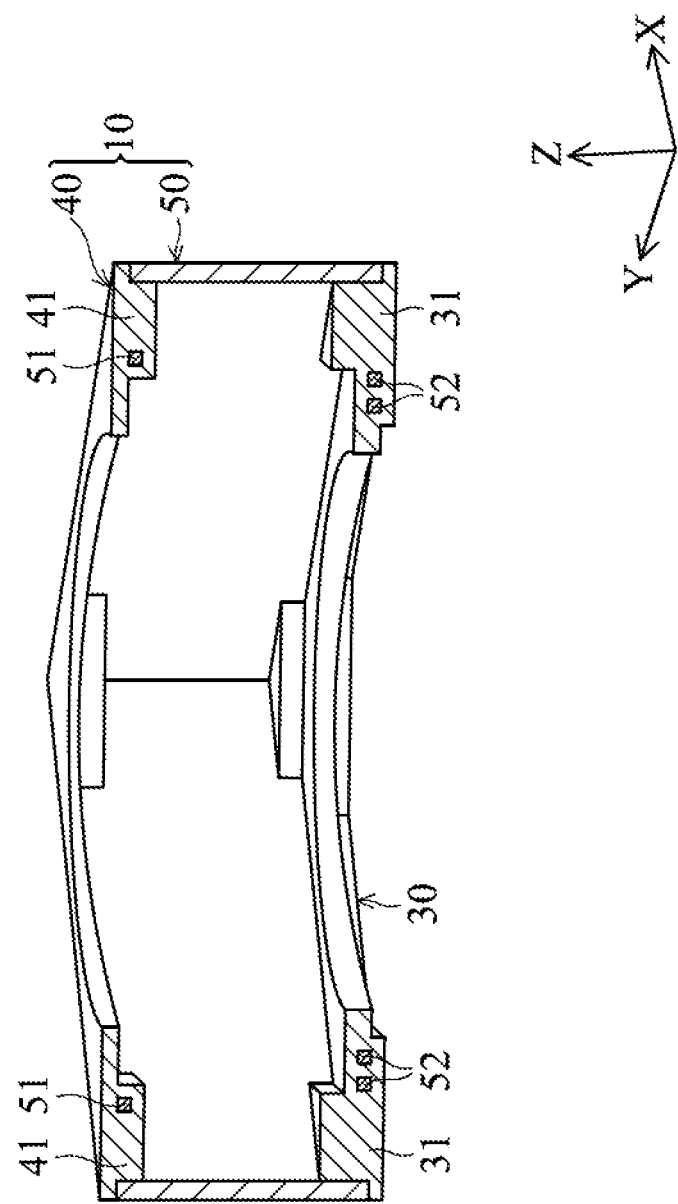
FIG. 4C shows a cross-sectional view of the cover 10 and the base 30 in FIG. 4B after assembly.

FIGS. 4A, 4B, and 4C show another embodiment of a driving mechanism, which is different from the embodiment of FIGS. 3A-3C in that: the base 30 in the present embodiment are integrally formed with the metal member 50 of the cover 10 in one piece. As shown in FIGS. 4B and 4C, the base 30 may comprise plastic material and form at least a embedding portion 31 at a corner thereof, and the metal member 50 forms at least a rod portion 52 at a corner thereof, corresponding to the embedding portion 31. During the manufacturing process, the rod portion 52 can be formed in advance, and the plastic base 30 is then formed on the metal member 50 by insert molding or other plastic forming process with the rod portion 52 embedded into the embedding portion 31 (FIG. 4C), so that the mechanical strength between the cover 10 and the base 30 can be efficiently improved.

Figure 5A:
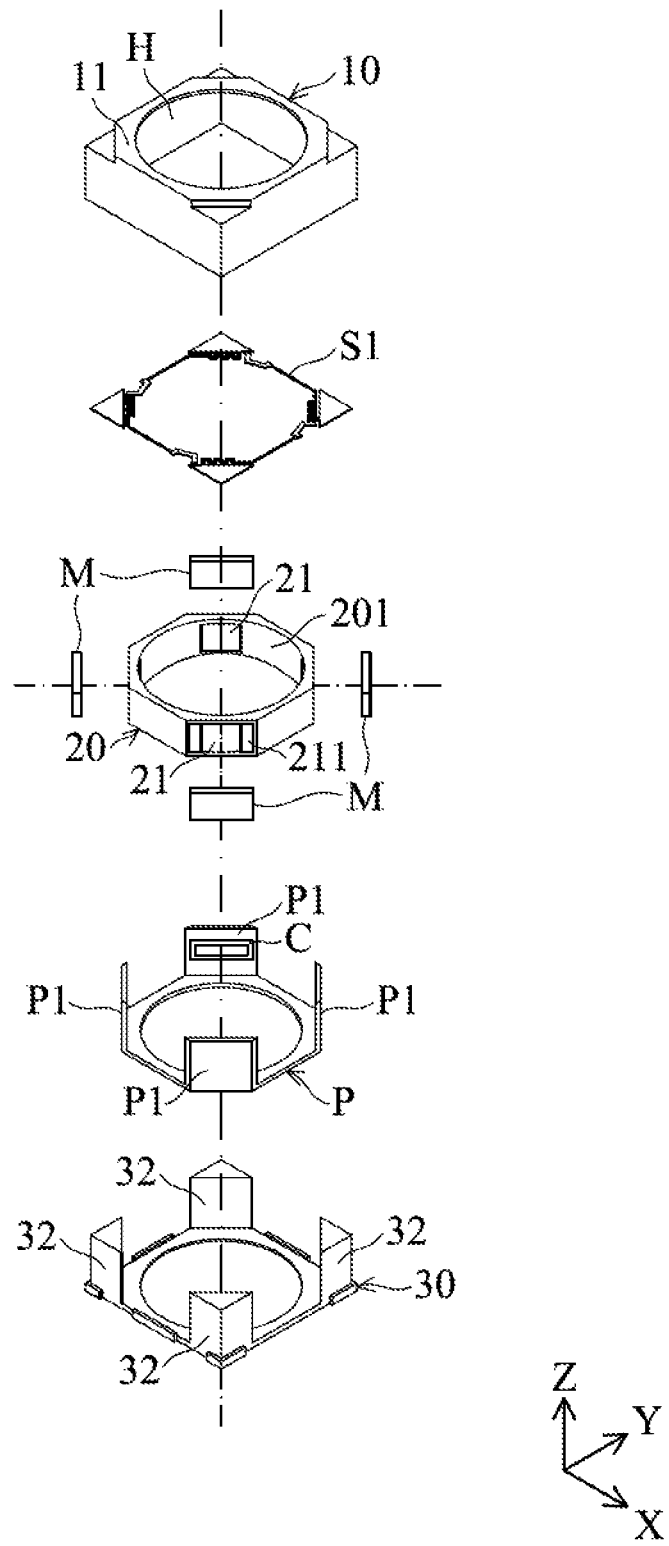
FIG. 5A shows an exploded diagram of a driving mechanism, in accordance with another embodiment of the invention.
Figure 5B:
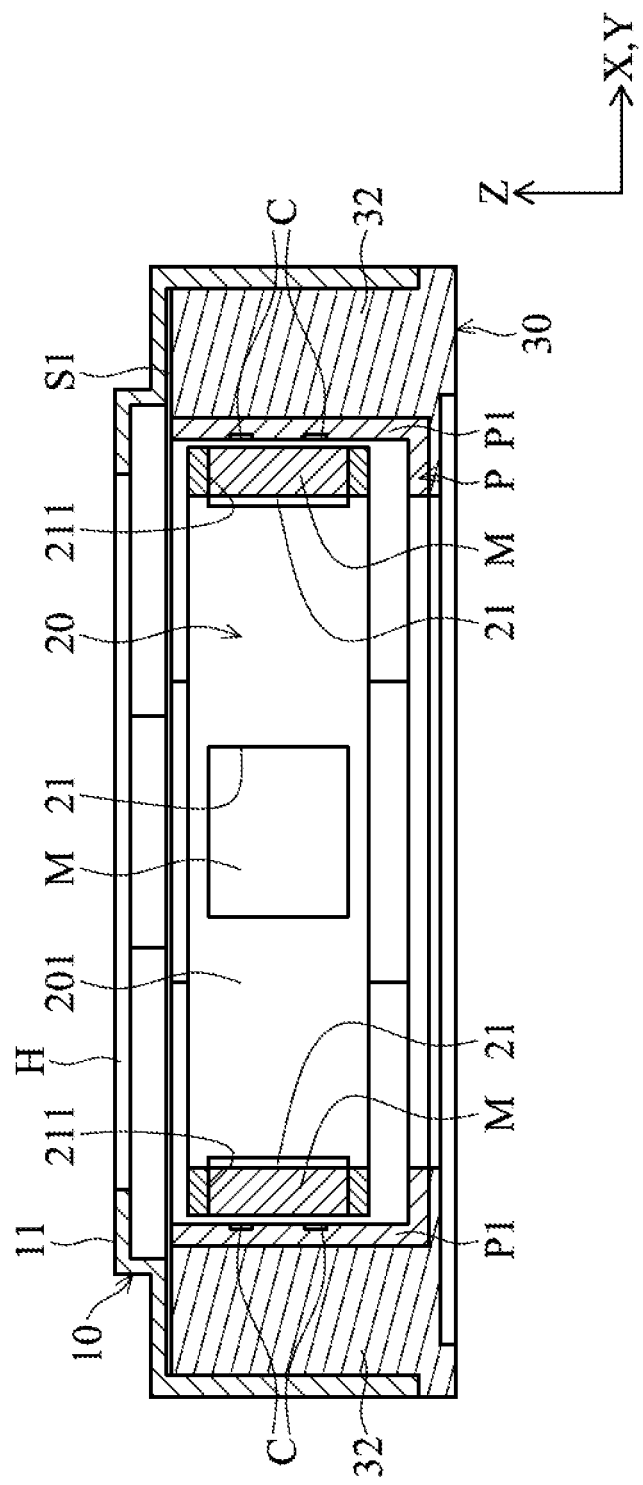
FIG. 5B shows cross-sectional view of the driving mechanism in FIG. 5A after assembly.

FIGS. 5A and 5B show another embodiment of a driving mechanism, which is different from the embodiment of FIGS. 1A-1D in that: the positions of the coil C and the magnets M are exchanged in the present embodiment. That is, the magnet M is disposed on the holder 20 as the first magnetic element, and the coil C (such as planar coil) is fixed to the base 30 and corresponds to the magnet M as the second magnetic element. Specifically, at least a recess 211 is formed on an outer surface of the sidewall portion 201 of the holder 20 and communicated with the through hole 21, wherein the magnet M (first magnetic element) is received in the recess 211 and exposed to the inner side of the holder 20 via the through hole 21.

In some embodiments, to further reduce the dimensions of the holder 20 along the horizontal direction (XY plane) as much as possible, a part of the magnet M may be tangential to the inner surface of the sidewall portion 201, so as to efficiently facilitate miniaturization of the driving mechanism.

Still referring to FIGS. 5A and 5B, a plurality of coils are presented in this embodiment, which may comprise planar coils respectively disposed on several extending segments P1 of a flexible circuit board P. Moreover, the base 30 forms several protruding portions 32 extending along the optical axis of the optical element (Z direction). During assembly, the protruding portions 32 can be used as support structures to sustain the extending segments P1 of the flexible circuit board P which are attached thereon. In this arrangement, cracks of the flexible circuit board P can be avoided when unintentional collision occurs, and particle intrusion into the driving mechanism can be also prevented and blocked by the flexible circuit board P.

In some embodiments, the coil C may be disposed in the recess 211 as the first magnetic element, and the magnet M may be fixed to the base 30 as the second magnetic element, corresponding to the coil C. When an electrical current is applied to the coil C, a magnetic force can be generated between the coil C and the magnet M, so as to drive the coil C, the holder 20, and the optical element therein to move along the Z axis relative to the cover 10 and the base 30, thereby achieving autofocusing and/or zooming.

Figure 6A:
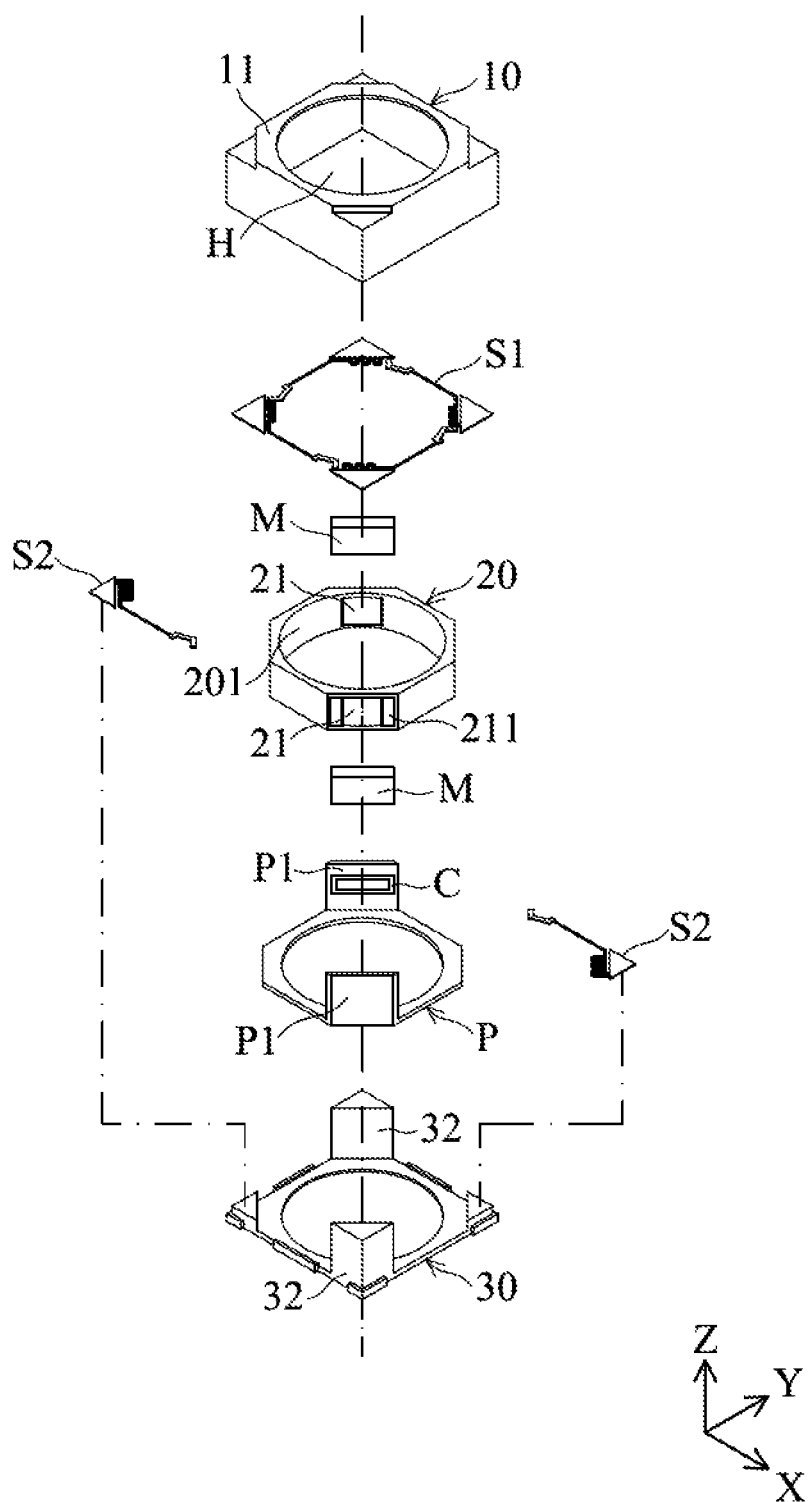
FIG. 6A shows an exploded diagram of a driving mechanism, in accordance with another embodiment of the invention.
Figure 6B:
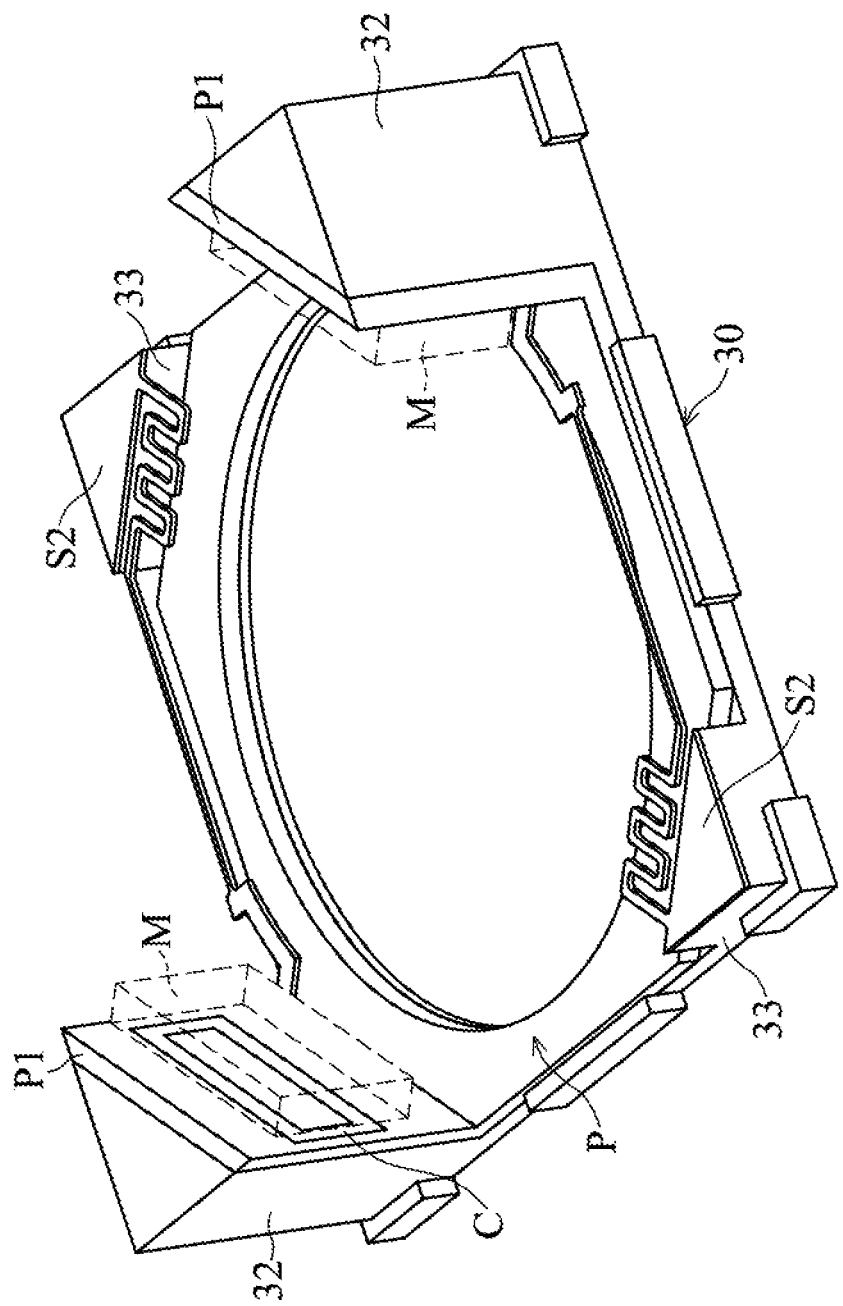
FIG. 6B shows a perspective diagram of the two lower springs S2 respectively connected to the two connecting portions 33 of the base 30.

Referring to FIGS. 6A and 6B, the present embodiment is different from the embodiment of FIGS. 3A-3C in that: only two protruding portions 32 are formed at two diagonal corners of the base 30, and the rest space can be saved for accommodating other components, such as the lower springs S2. As shown in FIG. 6B, the first ends of the two lower springs S2 may respectively connect to two connecting portions 33 at the diagonal corners of the base 30, and the second ends opposite to the first ends of the two lower springs S2 may connect to the holder 20 (not shown), wherein the height of the connecting portions 33 is lower than that of the protruding portions 32. Thus, space utilization can be more efficient to achieve miniaturization of the driving mechanism.

Figure 7A:
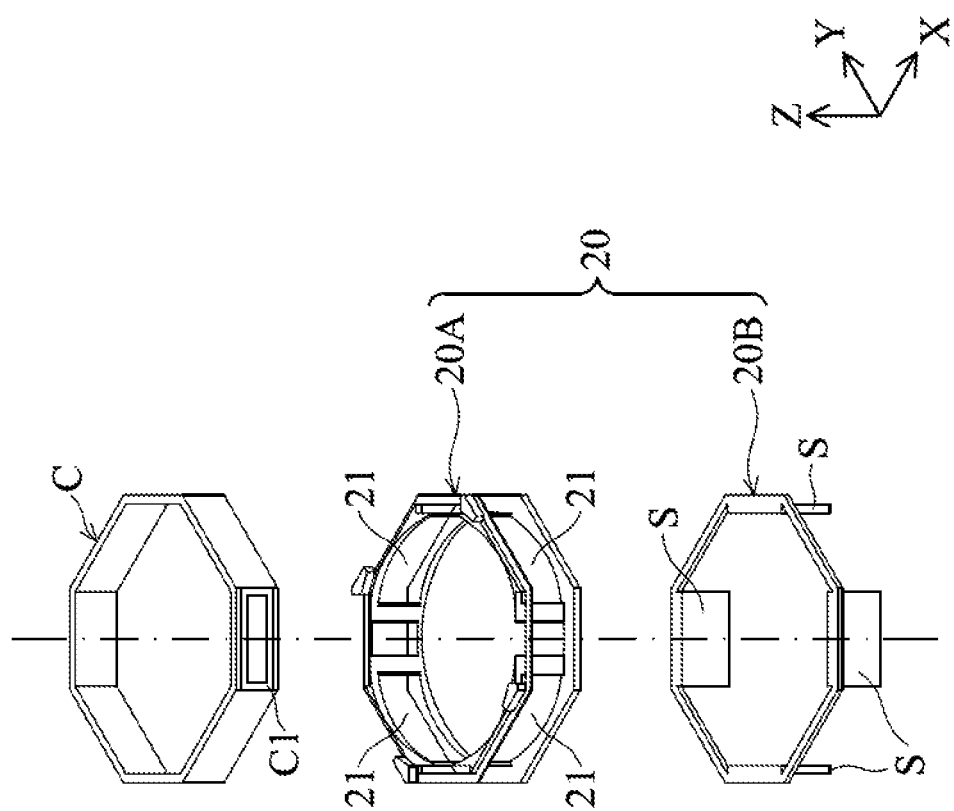
FIG. 7A shows an exploded diagram of a holder 20 and a coil C, in accordance with another embodiment of the invention.
Figure 7B:
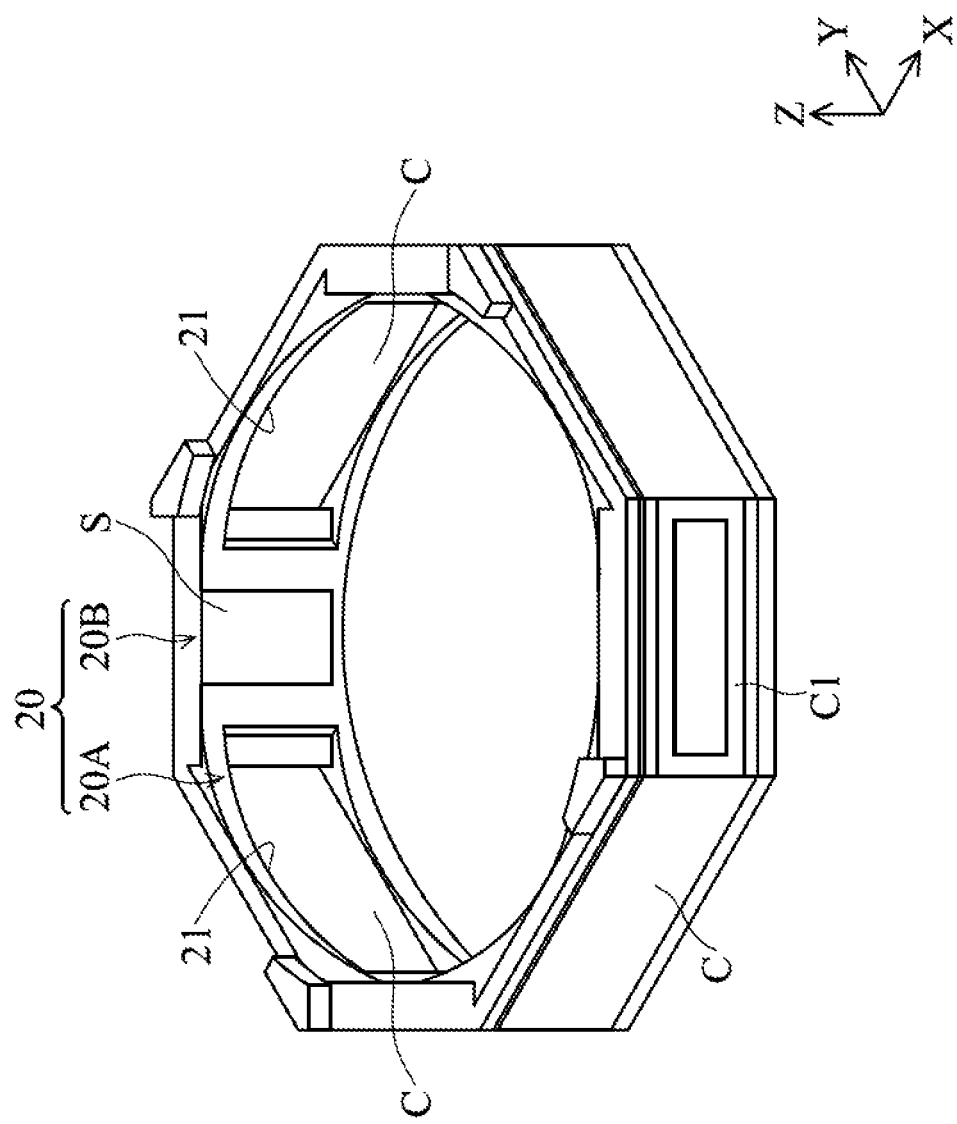
FIG. 7B shows a perspective diagram of the holder 20 and the coil C in FIG. 7A after assembly.

It should be noted that the holder 20 in the aforementioned embodiments may comprise two or more members which are made by different materials. As shown in FIGS. 7A and 7B, the holder 20 in this exemplary embodiment is substantially constituted by a plastic body 20A and a metal frame 20B. In practice, the metal frame 20B can be formed in advance, and the plastic body 20A is then formed on the metal member 50 by insert molding or other plastic forming process, so as to ensure adequate mechanical strength of the holder 20.

It should be noted that the coil C (first magnetic element) may be a planar coil and surround the holder 20, and the coil C is exposed to the inner side of the holder 20 via the through hole 21. Additionally, FIGS. 7A and 7B further show that at least a winding portion C1 of the coil C is located corresponding to a flat sustaining portion S of the metal frame 20B, which can firmly sustain the winding portion C1 in the driving mechanism.

As mentioned above, to reduce the dimensions of the holder 20 along the horizontal direction (XY plane) as much as possible, the through hole 21 needs to be formed on the holder 20. For at least this reason, the holder 20 may be constituted by the plastic body 20A and the metal frame 20B to not only improve the mechanical strength thereof, but also enhance the electromagnetic force produced by the magnet M and the coil C. Additionally, the through hole 21 may also be covered by the flexible and annular coil C, so as to prevent particle intrusion and overflow of the glue via the through hole 21.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A driving mechanism for driving an optical element, comprising:
a housing module;
a hollow holder, movably disposed in the housing module for holding the optical element, wherein the holder has a sidewall portion forming a through hole; and
an electromagnetic driving assembly, including a first magnetic element and a second magnetic element, wherein the first magnetic element is disposed on the holder and exposed to an inner side of the holder via the through hole, and the second magnetic element is connected to the housing module and corresponds to the first magnetic element to move the holder relative to the housing module;
wherein the through hole is exposed to a first outer side of the holder, the second magnetic element faces a second outer side of the holder, and the first outer side is neither perpendicular nor parallel to the second outer side.

2. The driving mechanism as claimed in claim 1, wherein the housing module has a cover having a top portion and a plurality of side walls, and the top portion forms an opening extending to at least one of the side walls.

3. The driving mechanism as claimed in claim 2, wherein the opening has a substantially round shape and forms a protruding area extending to the at least one of the side walls.

4. The driving mechanism as claimed in claim 2, wherein the cover comprises metal material.

5. The driving mechanism as claimed in claim 1, wherein the housing module has a polygonal structure, and the second magnetic element is disposed at a corner of the polygonal structure.

6. The driving mechanism as claimed in claim 1, wherein a part of the first magnetic element is tangential to an inner surface of the sidewall portion.

7. The driving mechanism as claimed in claim 1, wherein the holder comprises a metal frame and a plastic body connected to the metal frame.

8. The driving mechanism as claimed in claim 7, wherein the first magnetic element is a coil having a winding portion, and the metal frame has a flat sustaining portion to sustain the winding portion.

9. The driving mechanism as claimed in claim 1, wherein the housing module has a cover and a base connected to each other, and the cover has a metal member and a plastic body which are integrally formed in one piece.

10. The driving mechanism as claimed in claim 9, wherein the metal member forms a rod portion at a corner of the metal member, and the plastic body has an embedding portion with the rod portion embedded therein.

11. The driving mechanism as claimed in claim 9, wherein the metal member and the plastic body are integrally formed in one piece by insert molding process.

12. The driving mechanism as claimed in claim 1, wherein the housing module has a cover and a base connected to each other, the cover comprises metal material, and the base comprises plastic material, wherein the cover and the base are integrally formed in one piece.

13. The driving mechanism as claimed in claim 12, wherein the cover forms a rod portion at a corner of the cover, and the base forms an embedding portion with the rod portion embedded therein.

14. The driving mechanism as claimed in claim 12, wherein the cover and the base are integrally formed in one piece by insert molding process.

15. The driving mechanism as claimed in claim 1, wherein an outer surface of the sidewall portion forms a recess communicated with the through hole, and the first magnetic magnet is disposed in the recess.

16. The driving mechanism as claimed in claim 1, wherein the housing module has a base having a protruding portion extending along an optical axis of the optical element, and the second magnetic element is fixed to the protruding portion and corresponds to the first magnetic element.

17. The driving mechanism as claimed in claim 1, wherein the housing module has a quadrilateral base having two protruding portions extending along an optical axis of the optical element, and the protruding portions are respectively located at two diagonal corners of the base, corresponding to the electromagnetic driving assembly.

18. The driving mechanism as claimed in claim 17, further comprising two springs, wherein the base further has two connecting portions at the other two corners of the base, and the two springs respectively connect the connecting portions with the holder.

19. A driving mechanism for driving an optical element, comprising:
   a cover, having a top portion and an extending portion, wherein the top portion forms an opening, and the extending portion extends from an inner edge of the opening along an optical axis of the optical element;
   a hollow holder, movably disposed in the cover for holding the optical element, wherein the holder has a sidewall portion forming a through hole, and the extending portion is exposed to an inner side of the holder via the through hole; and
   an electromagnetic driving assembly, including a first magnetic element and a second magnetic element, wherein the first magnetic element is disposed on the holder, and the second magnetic element is connected to the cover and corresponds to the first magnetic element to move the holder relative to the cover;
   wherein the through hole is exposed to a first outer side of the holder, the second magnetic element faces a second outer side of the holder, and the first outer side is neither perpendicular nor parallel to the second outer side.

20. The driving mechanism as claimed in claim 19, wherein the holder further has a top surface and a restricting groove formed on the top surface, the restricting groove is communicated with the through hole, and the extending portion is extended into the restricting groove.

* * * * *